Patented Feb. 17, 1925.

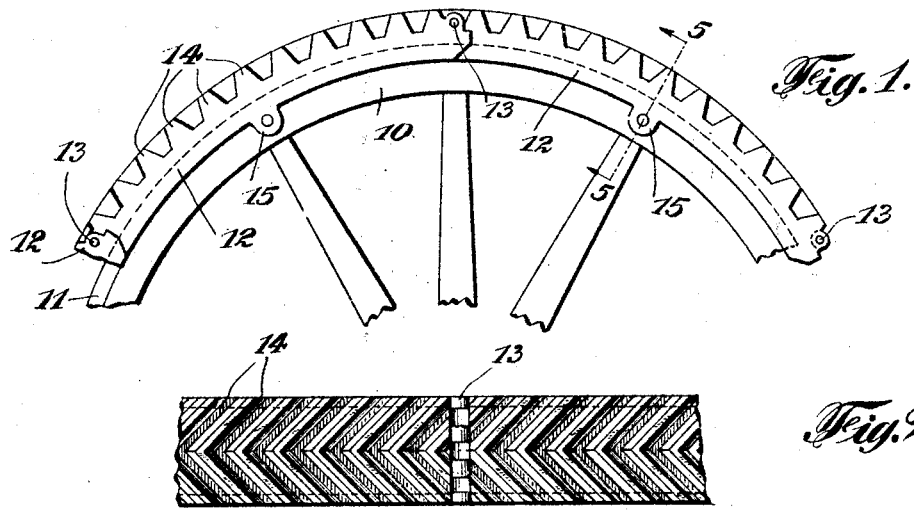
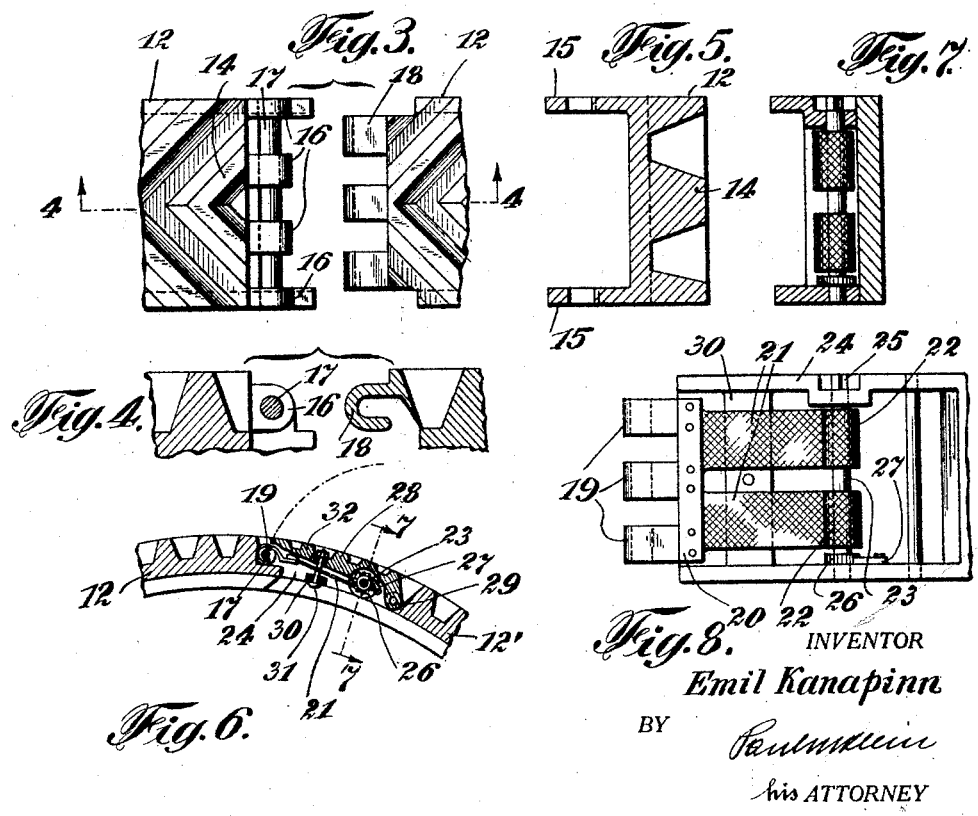

1,526,987

UNITED STATES PATENT OFFICE.

EMIL KANAPINN, OF SCHENECTADY, NEW YORK.

TRACTION BELT.

Application filed July 10, 1923. Serial No. 650,575.

*To all whom it may concern:*

Be it known that I, EMIL KANAPINN, citizen of Germany, and resident of Schenectady, in the county of Schenectady and State of New York, have invented certain new and useful Improvements in Traction Belts, of which the following is a specification.

This invention relates to traction belts for vehicle wheels, and particularly to the kind adapted to be used in conjunction with truck tires.

One object of my invention is to provide a friction or traction chain, which will facilitate the driving of a truck through sandy, muddy or slippery roads.

Another object of my invention is to provide a traction belt of this kind, which will be readily attached or detached whenever it is desired.

Another object of my invention is to provide a traction belt, which may be readily carried within the vehicle when not in use and which will consume a minimum space when it is secured in the vehicle.

A further object of my invention is to provide in combination with my traction belt, adjustable means for closing the various portions of the belt to an endless belt and facilitating the tightly fitting of the belt about the tire.

Another object of my invention is to provide within such device, an operating device for actuating this flexible closing means.

The foregoing and further objects will be more fully apparent from the following description of the accompanying drawings, forming part of this specification, and in which:

Figure 1 is a partial side elevation of my traction belt.

Figure 2 is a top view of a portion of my belt.

Figure 3 is a detail view of two ends of two adjoining links of my belt.

Figure 4 is a cross sectional view taken on line 4—4 of Figure 3.

Figure 5 is an enlarged cross sectional view taken on line 5—5 of Figure 1.

Figure 6 is a sectional detail view of my adjustable closing device.

Figure 7 is an enlarged cross sectional view taken on line 7—7 of Figure 6.

Figure 8 is an enlarged top view of my flexible closing device with the cover removed.

Referring to the drawings, numeral 10 denotes a vehicle wheel provided with a tire 11, upon which is mounted my traction belt, composed of a plurality of sections 12, which are hinged at 13 with each other.

Be it understood that there may be any number of sections combined together to a belt. Each of these sections is provided with herring-bone shaped ribs 14, providing a broad gripping or friction surface, which facilitates driving through sandy, muddy or slippery roads and is adapted to increase the tractions to a great extent.

Each of the links is preferably equipped with side lugs 15, by means of which the belt may be permanently secured to the wheel. However, the main purpose of my device is to attach my belt for only the period of time when it is actually needed, while being removed when the vehicle is running on good roads.

In Figures 3 and 4, it will be seen that each section of my belt is provided with hinge-like lugs 16 at one end, through which passes the bolt or pin 17, while the other end of each section is equipped with hook members 18, adapted to inter-lock with lugs 16 and hook over pins 17.

In Figures 5 and 7 it is shown that each section is provided with a channel like inner surface, adapted to embrace the tire portion of the wheel.

Extension 15 not only serves for the purpose of permanently attaching my traction belt to the wheel when it is so desired, but also to cooperate with the side flanges of the channel formed bottoms of the section, preventing a side swing of the sections relative to the wheel.

In manufacture it is intended to form each section in such a way as to exactly correspond with the curvature of the outer circumference of the standard size tires of the wheel.

Bearing in mind of the wear down of a tire, it becomes necessary to facilitate the shortening of the circumferential dimensions of my belt, for which purpose I have provided a flexible closing section, a detail of which is shown in Figures 6, 7 and 8.

It comprises mainly, of a flexible hook member, which comprises a plurality of hook elements 19, corresponding to hooks 18 of the other sections. These hook elements 19 are attached by any convenient means, indicated at 20 to a flexible double band 21, which is attached to rollers 22. These rollers are keyed to a shaft or pin 23, which is rotatably lodged in a special made frame 24, and which pin terminates beyond that frame at 25 in a square shaped extension, by means of which pin 23 may be rotated.

Keyed also to the pin 23 is a ratchet wheel 26 which is normally engaged by a spring actuated pawl 27.

Referring to Figure 6, it will be evident that when pin 23 is rotated in anti-clockwise direction bands 21 will be rolled on to rollers 22, whereby a taut connection will be had between hook elements 19 and pin 17 of belt section 12.

Pawl 27 engages ratchet wheel 26 and will prevent any backward movement of rollers 22.

Enclosing the entire connecting device is a cover indicated at 28, which is hinged at 29 to section 12'. This cover may be swung open when it is desired to disengage pawl 27 from ratchet wheel 26, preparatory to detaching my belt from the tire.

In order to prevent cover 28 from becoming loose, I provide in the reinforcing rib 30 of frame 24, a bolt 31, which passes through an aperture 32 of hinged cover 28. By means of a nut the lid is held in its intended place.

When it is desired to attach my belt to the wheel tire, it is best to connect section by section, placing it on the tire and fastening each section temporarily by means of a set screw, which may pass through the threaded hole of lugs 15. Then drive the vehicle slowly until each section tightly adheres to the tire and then adjust the flexible connecting means, preparatory to tightening the double band 21. The pin 23 is operated by means of a crank handle with a hollow square socket arrangement for the square extension 25.

When it is desired to dismount my belt, the adjustable connecting means is released by first lifting cover 28, disconnecting the belt 27 from ratchet wheel 26 and permitting the band 21 to be paid out until the hook elements 19 may be disengaged from pin 17. Then the belt may be readily taken off.

While I have shown a specific construction of my invention be it understood that various changes and improvements may be made, without departing from the broad scope of my idea, for which I claim:

1. In combination with a traction belt for vehicle tires composed of sections provided with traction ribs, of an end section having adjustable means for connecting the ends of the belt to form an endless belt said means comprising a flexible hook member adapted to be shortened or lengthened at will.

2. In combination with a detachable traction belt for vehicle tires, composed of a plurality of traction sections, of an end section having adjustable means for connecting the ends of the belt to form an endless traction belt, said means comprising a flexible hook member and a manually operable element for drawing in or paying out said flexible hook member.

3. A connecting device for detachable traction belts comprising a flexible connecting member, an operating member adapted to draw in or pay out said flexible member, and means for checking said operating member at any desired position.

Signed at Schenectady, in the county of Schenectady and State of New York, this 30th day of June A. D. 1923.

EMIL KANAPINN.